United States Patent [19]

Abe

[11] Patent Number: 4,708,700

[45] Date of Patent: Nov. 24, 1987

[54] DRIVING FORCE TRANSMISSION MECHANISM USING A TIMING BELT FOR AN INTERNAL COMBUSTION ENGINE

[75] Inventor: Shizuo Abe, Susono, Japan

[73] Assignee: Toyota Jidosha Kabushiki Kaisha, Toyota, Japan

[21] Appl. No.: 887,928

[22] Filed: Jul. 22, 1986

[30] Foreign Application Priority Data

Aug. 27, 1985 [JP] Japan .................... 60-129514[U]

[51] Int. Cl.⁴ .............................................. F16G 5/20
[52] U.S. Cl. .................................... 474/205; 198/834
[58] Field of Search ............... 474/202, 205, 265, 152, 474/153, 164; 198/834

[56] References Cited

U.S. PATENT DOCUMENTS

| | | | |
|---|---|---|---|
| 2,770,977 | 11/1956 | Beckadolph et al. | 474/153 |
| 4,276,039 | 6/1981 | Takano | 474/205 |
| 4,283,184 | 8/1981 | Berg | 474/205 X |
| 4,337,672 | 7/1982 | Shiber | 198/834 X |

FOREIGN PATENT DOCUMENTS

| | | | |
|---|---|---|---|
| 0076745 | 6/1981 | Japan | 474/205 |
| 60-57041 | 4/1985 | Japan . | |
| 60-5440 | 4/1985 | Japan . | |

*Primary Examiner*—Stephen J. Novosad
*Assistant Examiner*—Thuy M. Bui
*Attorney, Agent, or Firm*—Cushman, Darby & Cushman

[57] ABSTRACT

In a driving force transmission mechanism using a timing belt for an internal combustion engine according to the present invention, a face width of teeth of the timing belt at dedendums of the teeth is set larger than a width of engagement of a tooth of the timing belt with a tooth of a timing pulley. In the mechanism, a certain degree of freedom in accordance with elastic deformation is given to the width end portions of teeth of the timing belt, and thereby concentration of a load can be decreased on a corner of the dedendum of the teeth. As a result, breakage of the fibers of a canvas and cracking of the teeth of the timing belt etc. can be prevented, and the durability and the span of life of the timing belt can be increased.

16 Claims, 18 Drawing Figures

DRIVING FORCE TRANSMISSION MECHANISM USING A TIMING BELT FOR AN INTERNAL COMBUSTION ENGINE

BACKGROUND OF THE INVENTION

Field of the Invention

The present invention relates to a driving force transmission mechanism using a timing belt for an internal combustion engine, and particularly relates to a driving force transmission mechanism capable of decreasing a local load working on the timing belt during engagement of the timing belt with a timing pulley.

The engagement portion of a timing belt and a timing pulley, used for a driving force transmission mechanism of an internal combustion engine, is constituted generally as shown in FIG. 17. Face width W2 of the teeth of timing pulley 2 is set larger than face width W1 of the teeth of timing belt 1 to prevent timing belt 1 from disengaging with timing pulley 2. Therefore, teeth 3 of timing belt 1 engage with the teeth of timing pulley 2 over the entire length of teeth 3, and a local load is liable to add at a corner 4 of the dedendum of tooth 3, shown in FIG. 18. The corner 4 of the dedendum of tooth 3 is positioned at a side surface of timing belt 1, and is the severest portion with respect to strength in timing belt 1. Particularly, when torsional vibration or other vibration occurs in timing belt 1, a load is liable to concentrate to corner 4 of the dedendum of tooth 3. Ordinarily, a covering layer (for example, canvas 5 constructed of synthetic fiber, cotton, etc.) excellent in accordance with abrasion resistance is provided on the surface having the teeth of timing belt 1, and thereby the durability of the surface having teeth is increased.

However, timing belt 1 is usually manufactured by cutting or splitting a belt, having a ring-like shape and having a large size width, into members of ring-like shape. Therefore, both width end surfaces of timing belt 1 have cut surfaces of canvas 5 on account of the above manufacturing, and since fibers constituting canvas 5 are also cut at the width end surfaces, these portions become weak in strength.

In such a timing belt 1, if there occurs torsional vibration or waving of timing belt 1 or inclination or bending vibration of timing pulley 2, a load concentrates at corner 4 of the dedendum of teeth 3 on the side surface of timing belt 1 as aforementioned. Thus, there is the possibility that fibers of canvas 5 may be broken at the portion. The breakage of fibers of canvas 5 would eventually cause breaking of canvas 5 itself, cracking of teeth 3 at the dedendum or breaking off of teeth 3 in timing belt 1.

SUMMARY OF THE INVENTION

An object of the present invention is to provide a driving force transmission mechanism using a timing belt for an internal combustion engine, capable of suppressing the load concentration at a corner of the dedendum of teeth on a side surface of a timing belt which is the weakest portion in the timing belt, thereby preventing occurence of a crack etc. on the dedendum portion of teeth in the timing belt and lengthening the span of life of the timing belt.

To accomplish the above object, a driving force transmission mechanism using a timing belt for an internal combustion engine according to the present invention will be described as follows. The mechanism transmits a driving force via engagement of the timing belt with a timing pulley. A face width of teeth of the timing belt at the dedendum of the teeth is set larger than a width of engagement of a tooth of the timing belt with a tooth of the timing pulley.

The setting of the face width of teeth of the timing belt at the dedendum of the teeth, larger than the width of engagement of the tooth of the timing belt and the tooth of the timing pulley, is achieved by cutting out width end portions of teeth of the timing pulley or by making a tooth thickness at width end portions of teeth of the timing belt smaller than a tooth thickness at other portions of the teeth. Both of the above two methods for setting the face width of teeth of the timing belt can be applied irrespective of the relationship of sizes between the width of the timing belt and the width of the timing pulley. Moreover, a method for merely daring to use a timing belt wider than a timing pulley can be adapted to achieve the setting.

In the above driving force transmission mechanism, a force acting from the timing pulley to the timing belt is transmitted at the portion of engagement of teeth of the timing pulley with teeth of the timing belt via teeth of the timing belt. However, since the face width of teeth of the timing belt at the dedendum of the teeth is larger than the width of the engagement, the width end portions of teeth of the timing belt at the dedendum of the teeth do not directly contact with faces of teeth of the timing pulley. As a result, a relative position of teeth of the timing belt at the portions of the engagement with teeth of the timing pulley is constrained by directly contacting with teeth of the timing pulley, but the width end portions of teeth of the timing belt which do not directly contact with teeth of the timing pulley are given a certain degree of freedom in accordance with elastic deformation as compared with the engagement portions of the teeth, and thereby concentration of a load at the width end portions is decreased. Therefore, this prevents a large load from acting at the corners of teeth at the dedendums of the teeth and at a side surface of the timing belt, and thereby breakage of the fibers of the canvas and the cracking of teeth of the timing belt etc. can be prevented. Accordingly, the durability of the timing belt and the span of life of the timing belt are increased.

BRIEF DESCRIPTION OF THE DRAWINGS

The above and other objects, features and advantages of the present invention will become apparent and more readily appreciated from the following detailed description of the preferred exemplary embodiments of the invention, taken in conjunction with the accompanying drawings, in which.

DETAILED DESCRIPTION OF THE PREFERRED EMBODIMENTS

Figure 1:
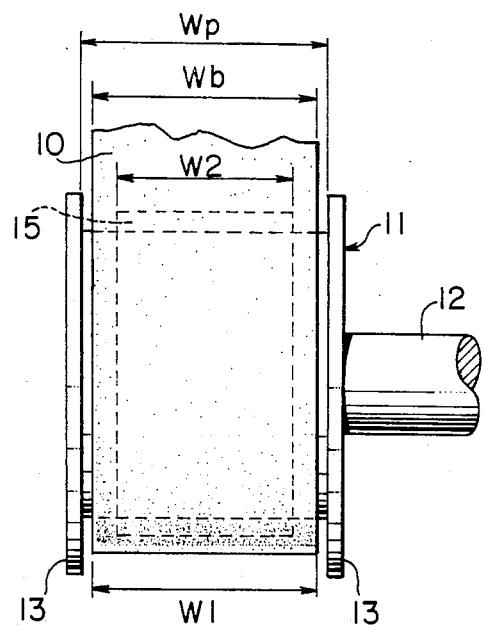
FIG. 1 is an elevational view of a driving force transmission mechanism using a timing belt for an internal combustion engine according to an embodiment of the present invention.
Figure 2:
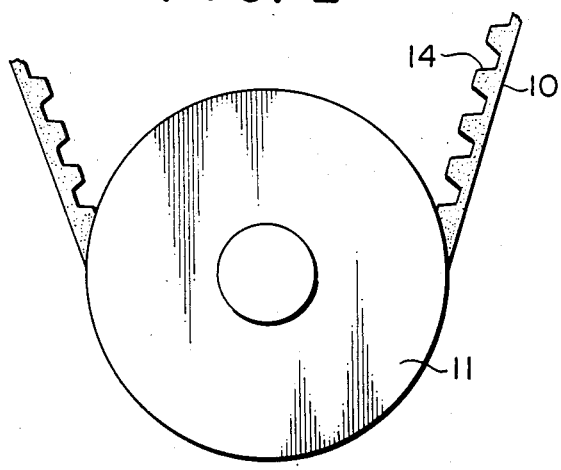
FIG. 2 is a side view of the driving force transmission mechanism shown in FIG. 1 according to the embodiment of the present invention.
Figure 3:
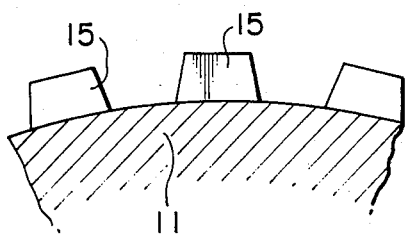
FIG. 3 is an enlarged partial sectional view of a timing pulley shown in FIG. 1 according to the embodiment of the present invention.
Figure 4:
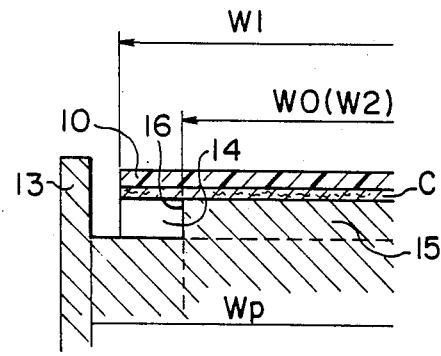
FIG. 4 is an enlarged partial sectional view of the driving force transmission mechanism shown in FIG. 1 according to the embodiment of the present invention.

Some preferred embodiments of the present invention will be described hereunder referring to the attached drawings.

FIGS. 1-4 illustrate a driving force transmission mechanism using a timing belt for an internal combustion engine according to an embodiment of the present invention. Numeral 10 shows a timing belt and numeral 11 shows a timing pulley fixed to timing pulley shaft 12. Guide flanges 13 are provided at both side portions of timing pulley 11 to prevent timing belt 10 from snaking and disengaging with timing pulley 11. On the timing belt 10 surface having teeth 14 a covering layer, constructed of canvas C, is provided.

In the embodiment, the width Wp of timing pulley 11 is set slightly larger than the width Wb of timing belt 10, and a face width W1 of teeth 14 of timing belt 10 has substantially the same size as the width Wb of timing belt 10.

A face width W2 of teeth 15 of timing pulley 11 is set smaller than face width W1 of teeth 14 of timing belt 10 by cutting out width end portions of teeth 15 which have been positioned at both ends of teeth 15 in the direction of face width of teeth 15 (that is, the pulley width direction). Therefore, a face width of teeth 14 of timing belt 10 at the dedendum of teeth 14 (in this embodiment, the face width is equal to W1) is set larger than a width W0 of engagement of tooth 14 of timing belt 10 with tooth 15 of timing pulley 11. In the embodiment, since end portions 16, where the width end portions of teeth 15 have been cut out, are formed in a stepped shape so that the face width at the addendum of teeth 15 can be substantially the same size as the face width at the dedendum of teeth 15, width W0 of engagement of tooth 14 with tooth 15 is identical with the face width W2 of teeth 15 of timing pulley 11, after cutting out the width end portions.

Figure 5:
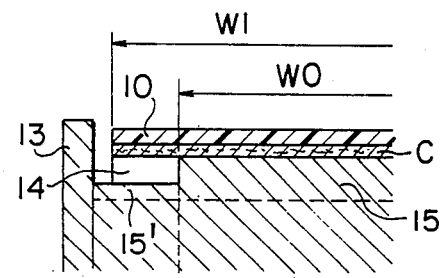
FIG. 5 is an enlarged partial sectional view of a driving force transmission mechanism according to a modification of the embodiment shown in FIG. 4 of the present invention.

In the above cutting out step, portion 15' at the dedendum of the width end portions of teeth 15 may be partially left as shown in FIG. 5.

Figure 6:
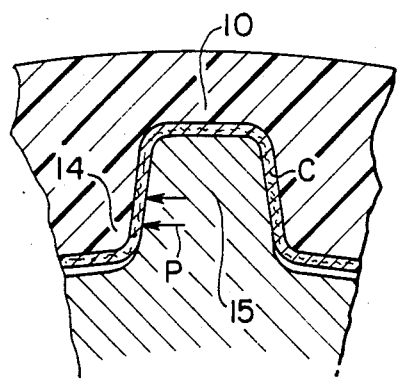
FIG. 6 is an enlarged partial sectional view of the driving force transmission mechanism shown in FIG. 1 according to the embodiment of the present invention.
Figure 7:
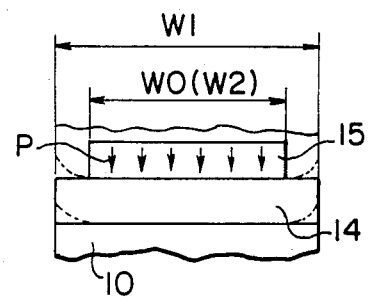
FIG. 7 is an enlarged partial plan view of a tooth of a timing belt and a tooth of a timing pulley of the driving force transmission mechanism shown in FIG. 1 according to the embodiment of the present invention.

In the above embodiment, as shown in FIGS. 6 and 7, a driving force P is transmitted from teeth 15 of timing pulley 11 to teeth 14 of timing belt 10 (or from teeth 14 to teeth 15) via engagement of teeth 14 of timing belt 10 with teeth 15 of timing pulley 11. Since face width W1 of teeth 14 of timing belt 10 is larger than face width W2 of teeth 15 of timing pulley 11, the width end portions of teeth 14 of timing belt 10 project from both width ends of teeth 15 of timing pulley 11 as shown in FIG. 7. Accordingly, face width W1 of teeth 14 of timing belt 10 becomes larger than engagement width W0, and when driving force P acts on tooth 14 with a width corresponding to the engagement width W0, width end portions of teeth 14 can have a certain degree of freedom in accordance with elastic deformation, as shown with over-action with chain lines in FIG. 7. As a result, a local load does not concentrate greatly at a corner of dedendum of teeth 14 of timing belt 10, a large load does not act there, and thereby a breakage of fibers of canvas C and a cracking of teeth 14 at the corner can be prevented.

Next, FIGS. 8-11 show modifications with respect to the shape at the width ends of teeth of a timing pulley.

Figure 8:
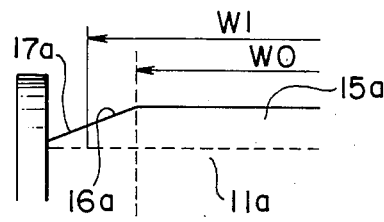
FIG. 8 is an enlarged partial elevational view of a tooth of a timing pulley according to a modification of the embodiment shown in FIG. 4 of the present invention.
Figure 9:
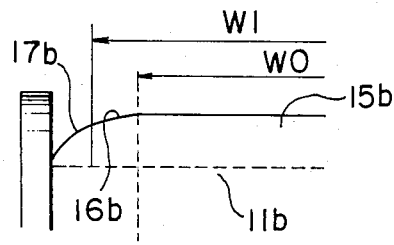
FIG. 9 is an enlarged partial elevational view of a tooth of a timing pulley according to a modification of the embodiment shown in FIG. 8 of the present invention.

In FIGS. 8 and 9, width end portions of teeth 15a or 15b of timing pulley 11a or 11b are cut out so that teeth 15a or 15b can be formed in a trapezoidal shape having a face width at the dedendum of teeth 15a or 15b larger than a face width at the addendum of teeth 15a or 15b. In FIG. 8, sides 17a of the trapezoidal shape are formed with straight lines. In FIG. 9, sides 17b of the trapezoidal shape are formed with curved lines. Thus, since face width W1 of teeth 14 of timing belt 10 at the dedendum of teeth 14 becomes larger than engagement width W0 even if end portions 16a or 16b are formed so as to be changed gradually, width end portions of teeth 14 at the dedendum can have a freedom in accordance with elastic deformation.

Figure 10:
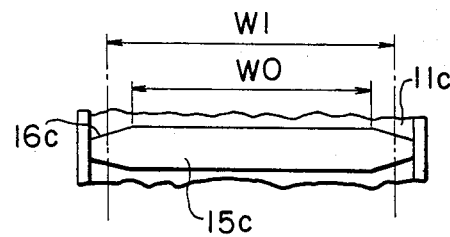
FIG. 10 is an enlarged plan view of a tooth of a timing pulley according to another modification of the embodiment shown in FIG. 4 of the present invention.
Figure 11:
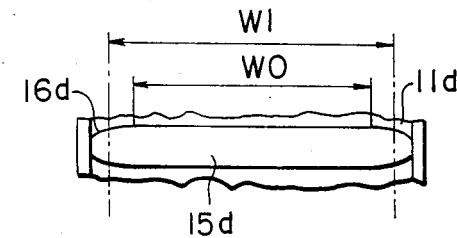
FIG. 11 is an enlarged plan view of a tooth of a timing pulley according to a modification of the embodiment shown in FIG. 10 of the present invention.

In FIGS. 10 and 11, width end portions of teeth 15c or 15d of timing pulley 11c or 11d are cut out so that a tooth thickness at the width end portions can become smaller than a tooth thickness at other portions of teeth 15c or 15d (that is, medium portions of teeth 15c or 15d in the face width direction). Then, the width end portions of teeth 15c and 15d are formed as a shape in which the tooth thickness at the width end portions becomes larger as advancing toward central portions of teeth 15c and 15d and which has straight side lines 16c (FIG. 10) or curved side lines 16d (FIG. 11) when taking a plan view of teeth 15c and 15d. Even in such shapes of teeth 15c and 15d, since face width W1 of teeth 14 of timing belt 10 at dedendum of teeth 14 is set larger than the engagement width W0, width end portions of teeth 14 at dedendums can have a freedom in accordance with elastic deformation. Therefore, concentration of a load at a corner of teeth 14 can be decreased.

Figure 12:
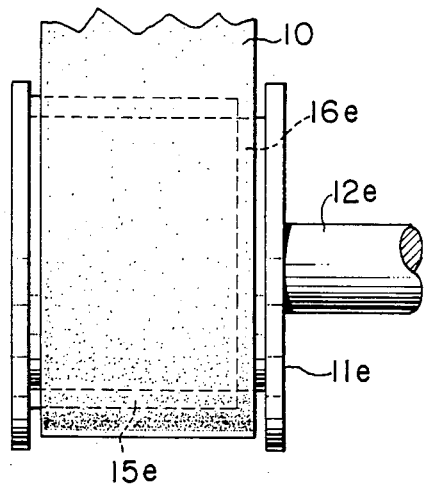
FIG. 12 is an elevational view of a driving force transmission mechanism according to a modification of the embodiment shown in FIG. 1 of the present invention.

FIG. 12 shows a modification of the embodiment shown in FIG. 1. In this embodiment, cutting out width end portions 16e from teeth 15e of timing pulley 11e are realized on only one side of teeth 15e in the direction of the face width, that is, on the side of timing pulley shaft 12e. In such a mechanism, particularly on the side of timing pulley shaft 12e in which a strong force is liable to work, a load acting on a corner of teeth 14 of timing belt 10 can be decreased.

Figure 13:
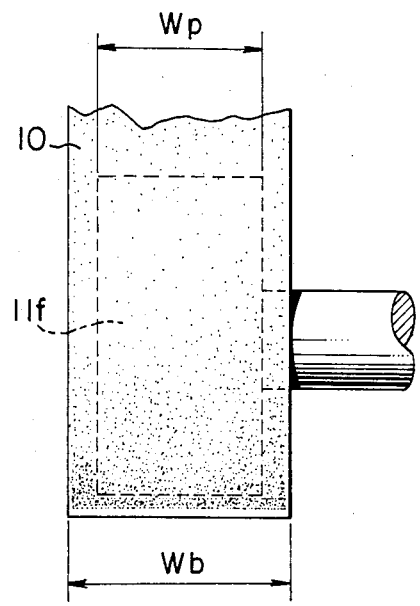
FIG. 13 is an elevational view of a driving force transmission mechanism according to another embodiment of the present invention.
Figure 14:
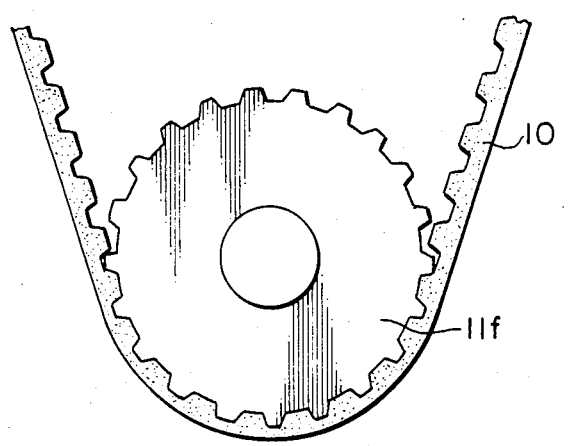
FIG. 14 is a side view of the driving force transmission mechanism shown in FIG. 13 according to the embodiment of the present invention.

Next, FIGS. 13 and 14 show another embodiment. In the embodiment, merely width Wb of timing belt 10 is set larger than width Wp of timing pulley 11f. Thus, even by daring to set the width Wb of timing belt 10 to an unusual size in accordance with a relationship between the width of a timing belt and the width of a timing pulley, a freedom upon elastic deformation is given to width end portions of teeth of timing belt 10. According to the freedom at the width end portions, concentration of a load at a corner of teeth of timing belt 10 will be decreased.

Figure 15:
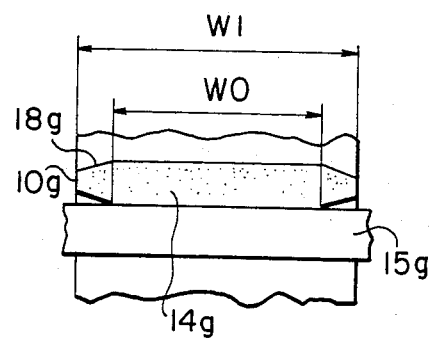
FIG. 15 is an enlarged partial plan view of a tooth of a timing belt and a tooth of a timing pulley according to a modification of the embodiment shown in FIG. 7 of the present invention.
Figure 16:
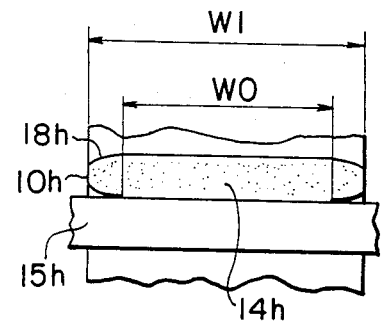
FIG. 16 is an enlarged partial plan view of a tooth of a timing belt and a tooth of a timing pulley according to a modification of the embodiment shown in FIG. 15 of the present invention.
Figure 17:
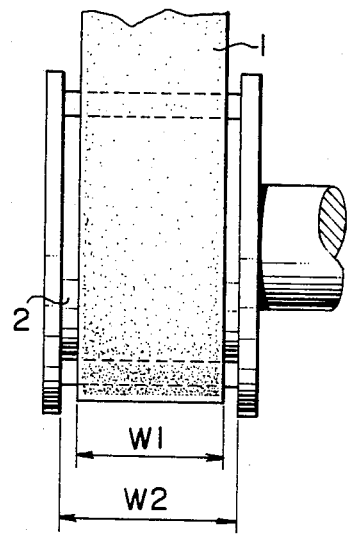
FIG. 17 is an elevational view of a conventional driving force transmission mechanism using a timing belt for an internal combustion engine.
Figure 18:
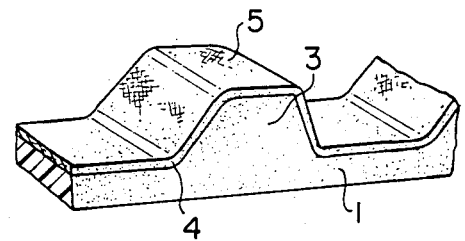
FIG. 18 is a partial oblique view of a conventional timing belt.

Next, FIGS. 15 and 16 show other embodiments making a tooth thickness of a timing belt at width end portions of teeth of the timing belt smaller than a tooth thickness at other portions of the teeth. Width end portions of teeth 14g or 14h of timing belt 10g or 10h are formed in a shape in which the tooth thickness at the width end portions of teeth 14g or 14h becomes larger as advancing toward the central portion of teeth 14g or 14h and which has straight side lines 18g (FIG. 15) or curved side lines 18h (FIG. 16) when taking a plan view of teeth 14g or 14h. Also in such a case, face width W1 of teeth 14g and 14h of timing belt 10g and 10h is set larger than the width Wo of engagement of tooth 14g or 14h with tooth 15g or 15h of a timing pulley. Therefore, a load working to a corner of teeth 14g and 14h at the dedendum thereof can be decreased by a freedom in accordance with elastic deformation at the width end portions. In these embodiments, the face width of teeth 15g or 15h of timing belt 10g or 10h is not restricted.

As described in detail in the above each embodiment, concentration of a load on a corner of teeth at the position of the dedendum of the teeth of a timing belt can be decreased by setting a face width of teeth of the timing belt at the dedendum of the teeth larger than a width of engagement of the tooth of the timing belt with a tooth of a timing pulley. By such a simple mechanism, a breakage of fibers of a canvas and a cracking of teeth of the timing belt etc. can be prevented, and thereby durability of the timing belt can be increased.

Moreover, a canvas should be strong to increase a shearing resistance of teeth of a timing belt, but if the teeth is covered with such a strong canvas, regidity of the timing belt is also increased as a whole, and thereby flexibility of the timing belt when winding the timing belt on a timing pulley and transmission efficiency of a driving force would be decreased. In the mechanism of the present invention, however, troubles such as a cracking of teeth and a breaking off of teeth etc. can be prevented merely by setting the relationship between an engagement width and a face width of teeth at the dedendum to the specific relationship.

Although only several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. A driving force transmission mechanism comprising:
   a timing pulley having teeth, each of said teeth having a width perpendicular to a direction of movement of said teeth; and
   a timing belt engaging said timing pulley, said timing belt having teeth, each of said timing belt teeth having a width perpendicular to a direction of movement of said timing belt teeth;
   a width of said timing belt not being larger than a width of said timing pulley;
   said width of said teeth of said timing belt at dedendums of said teeth being larger than a width of engagement of said teeth of said timing belt with said teeth of said timing pulley;
   at least one of width end portions of said teeth of said timing pulley and width end portions of said teeth of said timing belt being cut out so that width end portions of said teeth of said timing belt at dedendums of said timing belt do not contact said teeth of said timing pulley.

2. The transmission mechanism of claim 1, wherein the face width of teeth of said timing belt at the position of dedendum of said teeth is set larger than the width of engagement of the tooth of said timing belt with the tooth of said timing pulley by making a tooth thickness at width end portions of teeth of said timing belt smaller than a tooth thickness at other portions of said teeth.

3. The transmission mechanism of claim 1, wherein said timing pulley has a guide flange at a side portion thereof.

4. The transmission mechanism of claim 1, wherein the face width of teeth of said timing belt at dedendum positions of said teeth is set larger than the width of engagement of the tooth of said timing belt with the tooth of said timing pulley by cutting out width end portions of teeth of said timing pulley.

5. The transmission mechanism of claim 4, wherein said width end portions of teeth of said timing pulley being cut out are both of width end portions positioned at both ends of teeth.

6. The transmission mechanism of claim 4, wherein said width end portions of teeth of said timing pulley being cut out are one of the width end portions positioned at one end of teeth.

7. The transmission mechanism of claim 6, wherein said one of the width end portions are positioned at a side where a shaft for said timing pulley is provided.

8. The transmission mechanism of claim 4, wherein said width end portions of teeth of said timing pulley are cut out in a stepped shape so that a face width at addendum of said teeth of said timing pulley can be substantially the same size as a face width at the dedendum of said teeth of said timing pulley.

9. The transmission mechanism of claim 4, wherein said width end portions of teeth of said timing pulley are cut out so that said teeth can be formed in a trapezoidal shape having a face width at the dedendum of said teeth larger than a face width at addendums of said teeth.

10. The transmission mechanism of claim 9, wherein both sides of said trapezoidal shape are formed with straight lines.

11. The transmission mechanism of claim 9, wherein both sides of said trapezoidal shape are formed with curved lines.

12. The transmission mechanism of claim 4, wherein said width end portions of teeth of said timing pulley are cut out so that a tooth thickness at said width end portions can become smaller than a tooth thickness at other portions of said teeth.

13. The transmission mechanism of claim 12, wherein said width end portions of teeth of said timing pulley are formed as a shape in which the tooth thickness at said width end portions becomes larger as advancing toward the central portions of said teeth and which has straight side lines, when taking a plan view of said teeth.

14. The transmission mechanism of claim 12, wherein said width end portions of teeth of said timing pulley are formed as a shape in which the tooth thickness at said width end portions becomes larger as advancing toward the central portions of said teeth and which has curved side lines, when taking a plan view of said teeth.

15. The transmission mechanism of claim 2, wherein said width end portions of teeth of said timing belt are formed as a shape in which the tooth thickness at said width end portions becomes larger as advancing toward the central portions of said teeth and which has straight side lines, when taking a plan view of said teeth.

16. The transmission mechanism of claim 2, wherein said width end portions of teeth of said timing belt are formed as a shape in which the tooth thickness at said width end portions becomes larger as advancing toward the central portions of said teeth and which has curved side lines, when taking a plan view of said teeth.

* * * * *